United States Patent
Chi-Hsueh et al.

(10) Patent No.: US 10,214,089 B2
(45) Date of Patent: Feb. 26, 2019

(54) ENERGY EFFICIENT VEHICLE

(71) Applicants: Richard Chi-Hsueh, San Diego, CA (US); Chung-Yeh Hsu, New Taipei (TW)

(72) Inventors: Richard Chi-Hsueh, San Diego, CA (US); Chung-Yeh Hsu, New Taipei (TW)

( * ) Notice: Subject to any disclaimer, the term of this patent is extended or adjusted under 35 U.S.C. 154(b) by 0 days.

(21) Appl. No.: 15/696,572

(22) Filed: Sep. 6, 2017

(65) Prior Publication Data

US 2018/0105029 A1    Apr. 19, 2018

Related U.S. Application Data

(60) Provisional application No. 62/409,397, filed on Oct. 18, 2016, provisional application No. 62/412,246, filed on Oct. 24, 2016.

(51) Int. Cl.
| | |
|---|---|
| B60K 6/26 | (2007.10) |
| H02K 11/215 | (2016.01) |
| B60K 6/28 | (2007.10) |
| B60K 6/36 | (2007.10) |
| B60K 6/40 | (2007.10) |

(Continued)

(52) U.S. Cl.
CPC .......... *B60K 6/26* (2013.01); *B60K 6/28* (2013.01); *B60K 6/36* (2013.01); *B60K 6/40* (2013.01); *B60K 6/46* (2013.01); *B60K 17/16* (2013.01); *B60K 20/02* (2013.01); *B60L 11/123* (2013.01); *F01N 3/08* (2013.01); *F01N 3/101* (2013.01); *H02K 1/165* (2013.01); *H02K 1/18* (2013.01); *H02K 1/27* (2013.01); *H02K 1/30* (2013.01); *H02K 5/161* (2013.01); *H02K 5/225* (2013.01); *H02K 7/006* (2013.01); *H02K 7/04* (2013.01); *H02K 11/215* (2016.01); *H02K 16/00* (2013.01); *B60L 11/02* (2013.01); *B60L 2220/50* (2013.01);

(Continued)

(58) Field of Classification Search
CPC . H02K 16/00; B60K 6/26; B60K 6/46; B60K 2006/266
See application file for complete search history.

(56) References Cited

U.S. PATENT DOCUMENTS

| | | | | |
|---|---|---|---|---|
| 1,591,435 A | * | 7/1926 | Rohde | H02K 17/16 310/266 |
| 5,311,092 A | * | 5/1994 | Fisher | H02K 1/02 310/179 |

(Continued)

FOREIGN PATENT DOCUMENTS

CN    104875593 B    5/2017

*Primary Examiner* — Emma K Frick
(74) *Attorney, Agent, or Firm* — Rosenberg, Klein & Lee (57) ABSTRACT

An energy efficient vehicle is provided. Wheels are disposed on the front and rear sides of the car body. A gasoline engine in the car body is used to drive an electricity generator to produce electric energy transferred to a capacitive battery, and then to a multi-loop disc-type dynamic motor. The multi-loop disc-type dynamic motor drives the car by rotating the wheels through a transmission and a differential. The multi-loop disc-type dynamic motor can produce large torque and horsepower through multiple stator rings disposed on a stator base and multiple permanent magnetic sheets disposed on the multiple annular ribs of a rotor base. Therefore, the electricity can be saved to elevate the endurance of the vehicle, and the vehicle does not need to stop for charging.

20 Claims, 11 Drawing Sheets

(51) Int. Cl.
  *B60K 6/46* (2007.10)
  *B60K 17/16* (2006.01)
  *B60K 20/02* (2006.01)
  *B60L 11/12* (2006.01)
  *F01N 3/08* (2006.01)
  *H02K 1/16* (2006.01)
  *H02K 1/27* (2006.01)
  *H02K 1/30* (2006.01)
  *H02K 5/22* (2006.01)
  *H02K 7/00* (2006.01)
  *H02K 16/00* (2006.01)
  *H02K 1/18* (2006.01)
  *H02K 5/16* (2006.01)
  *H02K 7/04* (2006.01)
  *F01N 3/10* (2006.01)
  *B60L 11/02* (2006.01)

(52) U.S. Cl.
  CPC ....... *F01N 2590/11* (2013.01); *Y10S 903/906* (2013.01)

(56) References Cited

U.S. PATENT DOCUMENTS

| | | | | |
|---|---|---|---|---|
| 5,495,131 A | * | 2/1996 | Goldie | H02K 17/16 310/112 |
| 5,783,894 A | * | 7/1998 | Wither | H02K 21/12 310/156.26 |
| 6,147,415 A | * | 11/2000 | Fukada | F03D 3/0427 290/55 |
| 6,230,836 B1 | * | 5/2001 | Cowan | B62D 21/10 180/118 |
| 6,849,984 B2 | * | 2/2005 | Gallant | H02K 7/02 180/65.1 |
| 8,823,241 B2 | * | 9/2014 | Jore | H02K 1/12 310/156.37 |
| 9,000,644 B2 | * | 4/2015 | Kubes | B60K 6/26 310/112 |
| 9,296,312 B2 | * | 3/2016 | Zhao | B60K 16/00 |
| 9,397,545 B2 | * | 7/2016 | Willems | F16F 15/035 |
| 9,738,150 B2 | * | 8/2017 | Chi-Hsueh | B60K 6/46 |
| 9,923,420 B2 | * | 3/2018 | Takemoto | H02K 1/145 |
| 9,960,662 B2 | * | 5/2018 | Krishnamurthy | H02K 19/103 |
| 2004/0174082 A1 | * | 9/2004 | Graham | H02K 16/00 310/156.12 |
| 2005/0248231 A1 | * | 11/2005 | Kojima | H02K 16/00 310/266 |
| 2008/0214347 A1 | * | 9/2008 | Scharfenberg | B60K 7/0007 475/5 |
| 2009/0278415 A1 | * | 11/2009 | Park | H02K 16/00 310/156.08 |
| 2010/0082191 A1 | * | 4/2010 | Seo | B60K 6/46 701/22 |
| 2010/0264769 A1 | * | 10/2010 | Park | H02K 16/00 310/125 |
| 2011/0012466 A1 | * | 1/2011 | Blissenbach | H02K 3/28 310/195 |
| 2014/0111038 A1 | * | 4/2014 | Yang | H02K 16/00 310/46 |
| 2016/0226357 A1 | * | 8/2016 | Rozinsky | H02K 21/12 |
| 2017/0025977 A1 | * | 1/2017 | Armstrong | B60L 1/00 |
| 2018/0093656 A1 | * | 4/2018 | Yamazaki | B60W 20/13 |
| 2018/0109169 A1 | * | 4/2018 | Chi-Hsueh | H02K 16/00 |

* cited by examiner

ENERGY EFFICIENT VEHICLE

REFERENCE TO RELATED APPLICATIONS

This Patent Application claims the benefit of Provisional Patent Application Ser. No. 62/409,397 filed 18 Oct. 2016, and Provisional Patent Application Ser. No. 62/412,246 filed 24 Oct. 2016.

BACKGROUND

Field of Invention

The disclosure relates to an energy efficient vehicle. More particularly, the disclosure relates to an energy efficient vehicle having features of providing large torque and horsepower, as well as effective energy saving to achieve the effect that the vehicle does not need to stop for charging.

Description of Related Art

The engine-driven vehicle, such as cars, mainly use gasoline as fuel. However, problems of global warming and air pollution caused by exhaust emission are increased. Therefore, hybrid vehicles and electric vehicles are successively developed.

Figure 11:
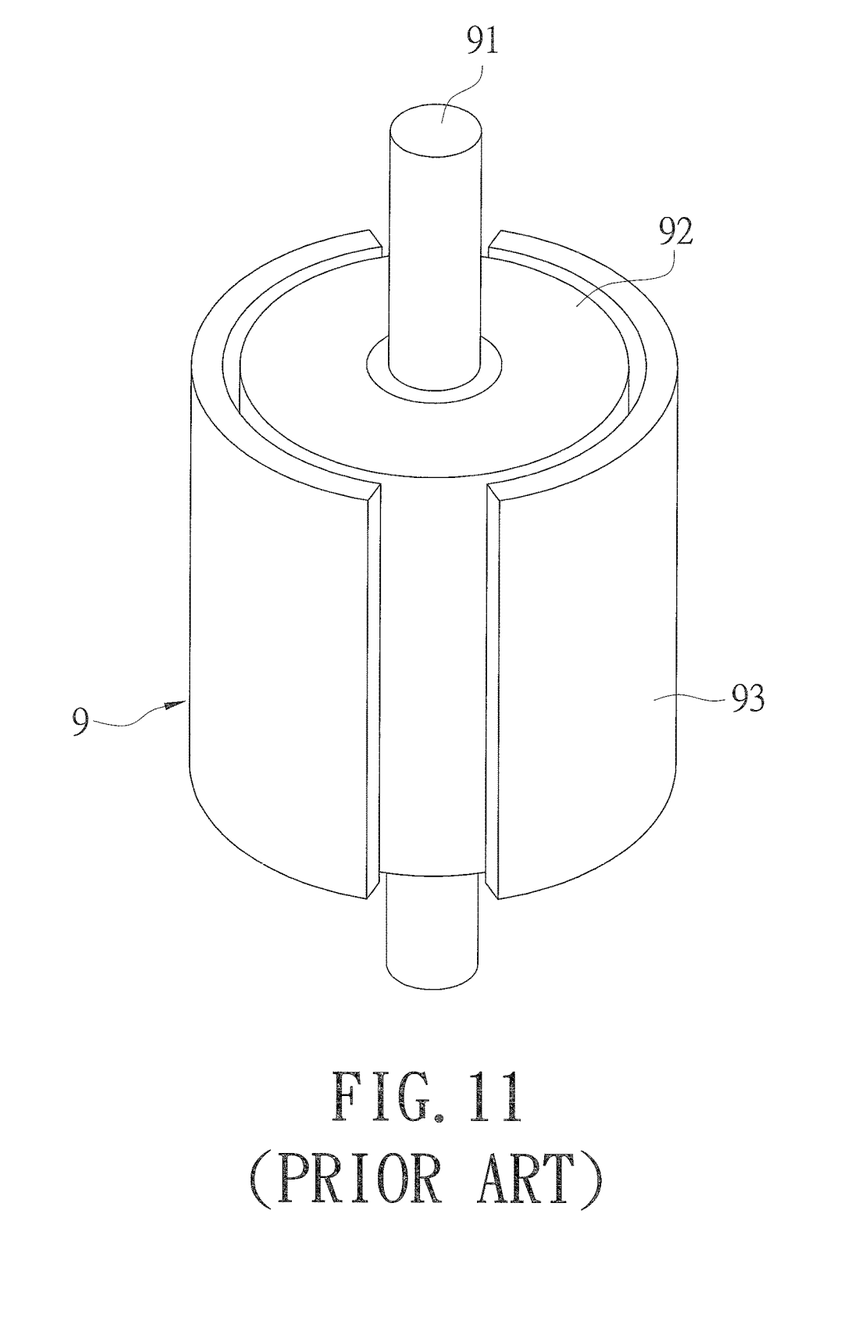
FIG. 11 is a perspective view of a conventional cylindrical-type motor.

Cylindrical-type motors in the present hybrid vehicles and electric vehicles are designed mainly for operating machines fixed in factory, which can be connected to a power cable for unlimitedly supplying electricity, and do not need to use batteries. Please refer to FIG. 11, which is a diagram of a cylindrical-type motor in the present hybrid vehicles and electric vehicles. The cylindrical motor 9 comprises a central rotation shaft 91, a cylindrical induction coils 92 surrounding the rotation shaft 91, and two permanent magnets 93 covering the induction coils 92. Since only two permanent magnets 93 and the twist radius of motor is small, the generated horsepower is quite limited. In order to increase the horsepower, more electricity is needed. Therefore, the cylindrical-type motor is very power consumption, and the endurance of the electric vehicle is poor. Hence, the electric vehicle has to frequently stop for charging.

Therefore, in view of the drawbacks of poor horsepower and energy consumption in the present electric vehicle, the inventors develop this invention by the many-year manufacturing and design experience and knowledge in the related fields and ingenuity.

SUMMARY

An energy efficient vehicle is disclosed to provide large torque and horsepower, as well as effective energy saving to achieve the effect that the vehicle does not need to stop for charging.

In order to achieve the goals above, an energy efficient vehicle is further developed based on the allowed patents "Energy efficient vehicle and disc-type dynamic motor thereof" of U.S. Pat. No. 9,738,150 B2 and Chinese Patent Pub. No. CN 104875593 B.

According to a first embodiment of this invention, an energy efficient vehicle is provided. The energy efficient vehicle comprises a car body and four wheels respectively disposed on front and rear sides of the car body. A gasoline engine is disposed in the car body. An electricity generator is connected to the gasoline engine. A power and motor controller is connected to the electricity generator. A capacitive battery is connected to the power and motor controller. A multi-loop disc-type dynamic motor is disposed on a front or rear side of the car body, wherein the multi-loop disc-type dynamic motor is connected to the capacitive battery by a power cable and is connected to the power and motor controller by a signal cable.

The multi-loop disc-type dynamic motor comprises a stator base, a rotor base, and a liner cover. The stator base has a chamber therein. A shaft hole is disposed in a center of a bottom of the chamber. A plurality of concentric annular ribs with increasing diameters are disposed on the bottom of the chamber with the shaft hole as a center. A plurality of annular slots are disposed between the annular ribs on the stator base. A plurality of stator rings are respectively disposed in each of the annular slots on the stator base. A plurality of coils are respectively disposed on the stator rings and connected to the power cable of the capacitive battery. A shaft sleeve is disposed in a center of the rotor base. A shaft hole is disposed in the shaft sleeve in a penetration mode. A positioning part is disposed on the wall of the shaft hole of the rotor base. A plurality of concentric annual ribs with increasing diameters are disposed on the rotor base with the shaft hole as a center. A plurality of annular slots are respectively disposed between the annular ribs on the rotor base. The rotor base is correspondingly engaged with the stator base, so that the annular ribs of the stator base respectively disposed in the annular slots of the rotor base. The annular ribs and the permanent magnetic sheets attached thereon of the rotor base are correspondingly disposed on each of the annular slots, and hence the permanent magnetic sheets are corresponding to the coils of the stator rings in the annular slots of the stator base. The liner cover covers an opening of the chamber of the stator base, wherein the liner cover is locked on the stator base. A shaft hole is disposed on a center of the liner cover. A rotational shaft penetrates the shaft holes of the liner cover, the rotor base, and the stator base, wherein a positioning part of the rotating shaft is combined with the positioning part on the wall of the shaft hole of the rotor base. One end of the rotational shaft is connected to a transmission in the car body, the transmission is connected to a differential on the front or rear side of the car body, and the differential is connected to the corresponding two wheels on the front or rear side of the car body.

According to a second embodiment of this invention, another energy efficient vehicle is provided. The energy efficient vehicle comprises a car body and four wheels respectively disposed on front and rear sides of the car body. A gasoline engine is disposed in the car body. An electricity generator is connected to the gasoline engine. A power and motor controller is connected to the electricity generator. A capacitive battery is connected to the power and motor controller. Two multi-loop disc-type dynamic motors are disposed on front and rear sides of the car body, wherein each of the multi-loop disc-type dynamic motor is connected to the capacitive battery by a power cable and is connected to the power and motor controller by a signal cable.

Each of the two multi-loop disc-type dynamic motor comprises a stator base, a rotor base, and a liner cover. The stator base has a chamber therein. A shaft hole is disposed in a center of a bottom of the chamber. A plurality of concentric annular ribs with increasing diameters are disposed on the bottom of the chamber with the shaft hole as a center. A plurality of annular slots are disposed between the annular ribs on the stator base. A plurality of stator rings are respectively disposed in each of the annular slots on the stator base. A plurality of coils are respectively disposed on the stator rings and connected to the power cable of the capacitive battery. A shaft sleeve is disposed in a center of the rotor base. A shaft hole is disposed in the shaft sleeve in a penetration mode. A positioning part is disposed on the wall of the shaft hole of the rotor base. A plurality of concentric annual ribs with increasing diameters are disposed on the rotor base with the shaft hole as a center. A plurality of annular slots are respectively disposed between the annular ribs on the rotor base. The rotor base is correspondingly engaged with the stator base, so that the annular ribs of the stator base respectively disposed in the annular slots of the rotor base. The annular ribs and the permanent magnetic sheets attached thereon of the rotor base are correspondingly disposed on each of the annular slots, and hence the permanent magnetic sheets are corresponding to the coils of the stator rings in the annular slots of the stator base. The liner cover covers an opening of the chamber of the stator base, wherein the liner cover is locked on the stator base. A shaft hole is disposed on a center of the liner cover. A rotational shaft penetrates the shaft holes of the liner cover, the rotor base, and the stator base, wherein a positioning part of the rotating shaft is combined with the positioning part on the wall of the shaft hole of the rotor base. One end of the rotational shaft is connected to a transmission in the car body, the transmission is connected to a differential on the front or rear side of the car body, and the differential is connected to the corresponding two wheels on the front or rear side of the car body.

In some embodiments, the energy efficient vehicle further comprises a starter motor and a battery connected to the starter motor disposed in the car body. The starter motor is connected to the gasoline engine.

In still some embodiments, the energy efficient vehicle further comprises an engine exhaust purification device disposed in the car body. One end of the engine exhaust purification device is connected to the gasoline engine, another end of the engine exhaust purification device is connected to one end of an exhaust pipe, and another end of the exhaust pipe is connected with an exhaust muffler.

According to a third embodiment of this invention, another energy efficient vehicle is provided. The energy efficient vehicle comprises a car body and four wheels respectively disposed on front and rear sides of the car body. A power supply unit is disposed in the car body. A power and motor controller is connected to the power supply unit. A capacitive battery is connected to the power and motor controller. A multi-loop disc-type dynamic motor is disposed on a front or rear side of the car body, wherein the multi-loop disc-type dynamic motor is connected to the capacitive battery by a power cable and is connected to the power and motor controller by a signal cable.

The multi-loop disc-type dynamic motor comprises a stator base, a rotor base, and a liner cover. The stator base has a chamber therein. A shaft hole is disposed in a center of a bottom of the chamber. A plurality of concentric annular ribs with increasing diameters are disposed on the bottom of the chamber with the shaft hole as a center. A plurality of annular slots are disposed between the annular ribs on the stator base. A plurality of stator rings are respectively disposed in each of the annular slots on the stator base. A plurality of coils are respectively disposed on the stator rings and connected to the power cable of the capacitive battery. A shaft sleeve is disposed in a center of the rotor base. A shaft hole is disposed in the shaft sleeve in a penetration mode. A positioning part is disposed on the wall of the shaft hole of the rotor base. A plurality of concentric annual ribs with increasing diameters are disposed on the rotor base with the shaft hole as a center. A plurality of annular slots are respectively disposed between the annular ribs on the rotor base. The rotor base is correspondingly engaged with the stator base, so that the annular ribs of the stator base respectively disposed in the annular slots of the rotor base. The annular ribs and the permanent magnetic sheets attached thereon of the rotor base are correspondingly disposed on each of the annular slots, and hence the permanent magnetic sheets are corresponding to the coils of the stator rings in the annular slots of the stator base. The liner cover covers an opening of the chamber of the stator base, wherein the liner cover is locked on the stator base. A shaft hole is disposed on a center of the liner cover. A rotational shaft penetrates the shaft holes of the liner cover, the rotor base, and the stator base, wherein a positioning part of the rotating shaft is combined with the positioning part on the wall of the shaft hole of the rotor base. One end of the rotational shaft is connected to a transmission in the car body, the transmission is connected to a differential on the front or rear side of the car body, and the differential is connected to the corresponding two wheels on the front or rear side of the car body.

In some embodiments, the power supply comprises a plurality of batteries.

In still some embodiments, the energy efficient vehicle further comprises two support beams disposed on the bottom of the car body and a holder disposed between the two support beams for fixing the multi-ring disc-type dynamic motor. Each of the support beams comprises a first support section, a second support section and an anti-shock buffer shaft therebetween to be pivotally connected to the first and the second support sections In still some embodiments, the energy efficient vehicle further comprises a driving room in the car body, and a shift lever disposed in the driving room and connected to the transmission.

In still some embodiments, the energy efficient vehicle further comprises a Hall device disposed on the stator rings and connected to the coils on the stator rings in the multi-ring disc-type dynamic motor.

In still some embodiments, the energy efficient vehicle further comprises a plurality of balance sheets disposed on a periphery of the rotor base of multi-ring disc-type dynamic motor, and a plurality of reinforcing sheets disposed on a bottom of the balance sheets. The reinforcing sheets and the balance sheets are connected as one.

Hence, when the energy efficient vehicle is used, the gasoline engine in the car body is used to drive the electricity generator to produce electric energy transferred to the capacitive battery, and then to the multi-loop disc-type dynamic motor. The multi-loop disc-type dynamic motor drives the car by rotating the wheels through the transmission and the differential. The multi-loop disc-type dynamic motor can produce large torque and horsepower through multiple stator rings disposed on a stator base and multiple permanent magnetic sheets disposed on the multiple annular ribs of a rotor base. Therefore, the electricity can be saved to elevate the endurance of the vehicle, and the vehicle does not need to stop for charging.

DETAILED DESCRIPTION

To more completely and clearly illustrate the technical means and effects of this invention, the detailed descriptions are set forth below. Please refer to the disclosed figures and the reference numbers.

Figure 1:
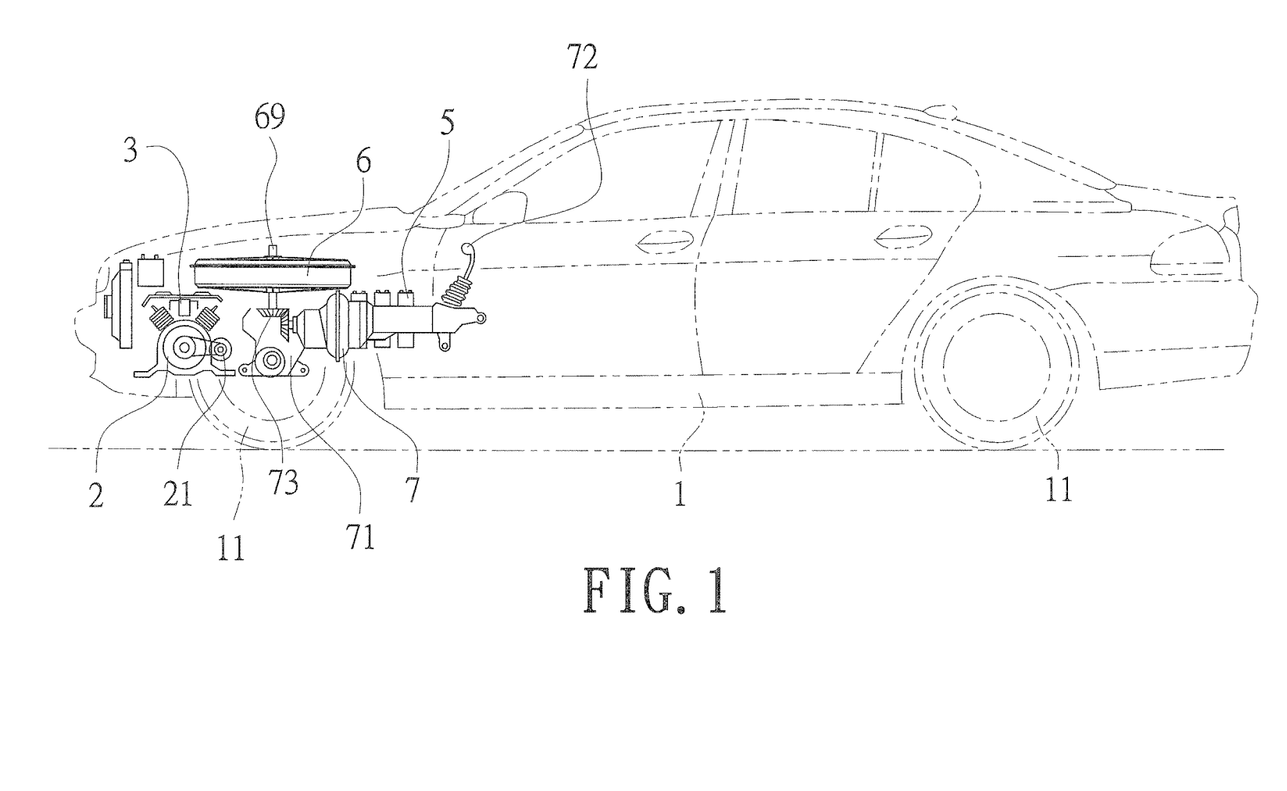
FIG. 1 is a side view of an energy efficient vehicle according to one embodiment of this invention.
Figure 2:
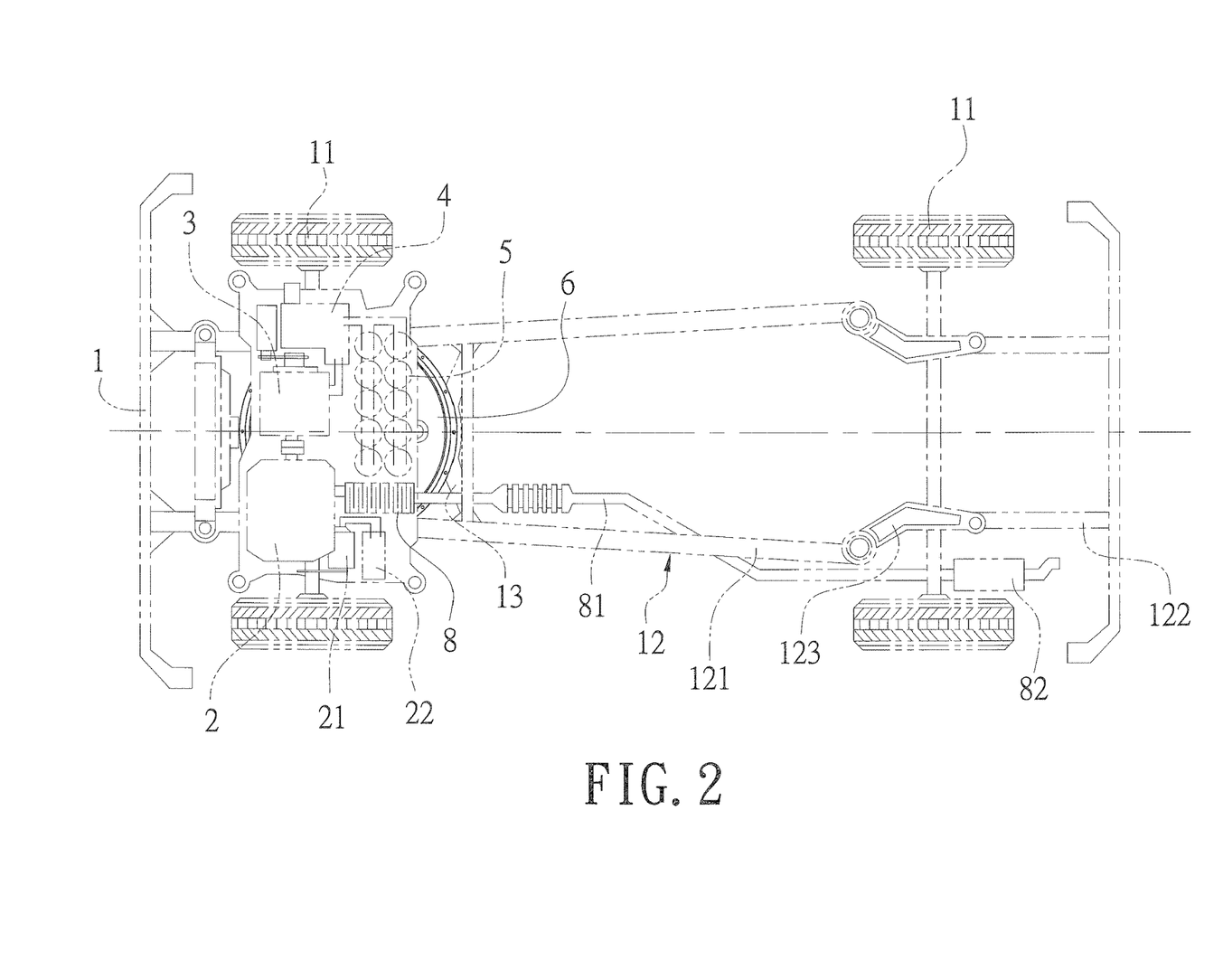
FIG. 2 is a bottom view of an energy efficient vehicle according to one embodiment of this invention.
Figure 3:
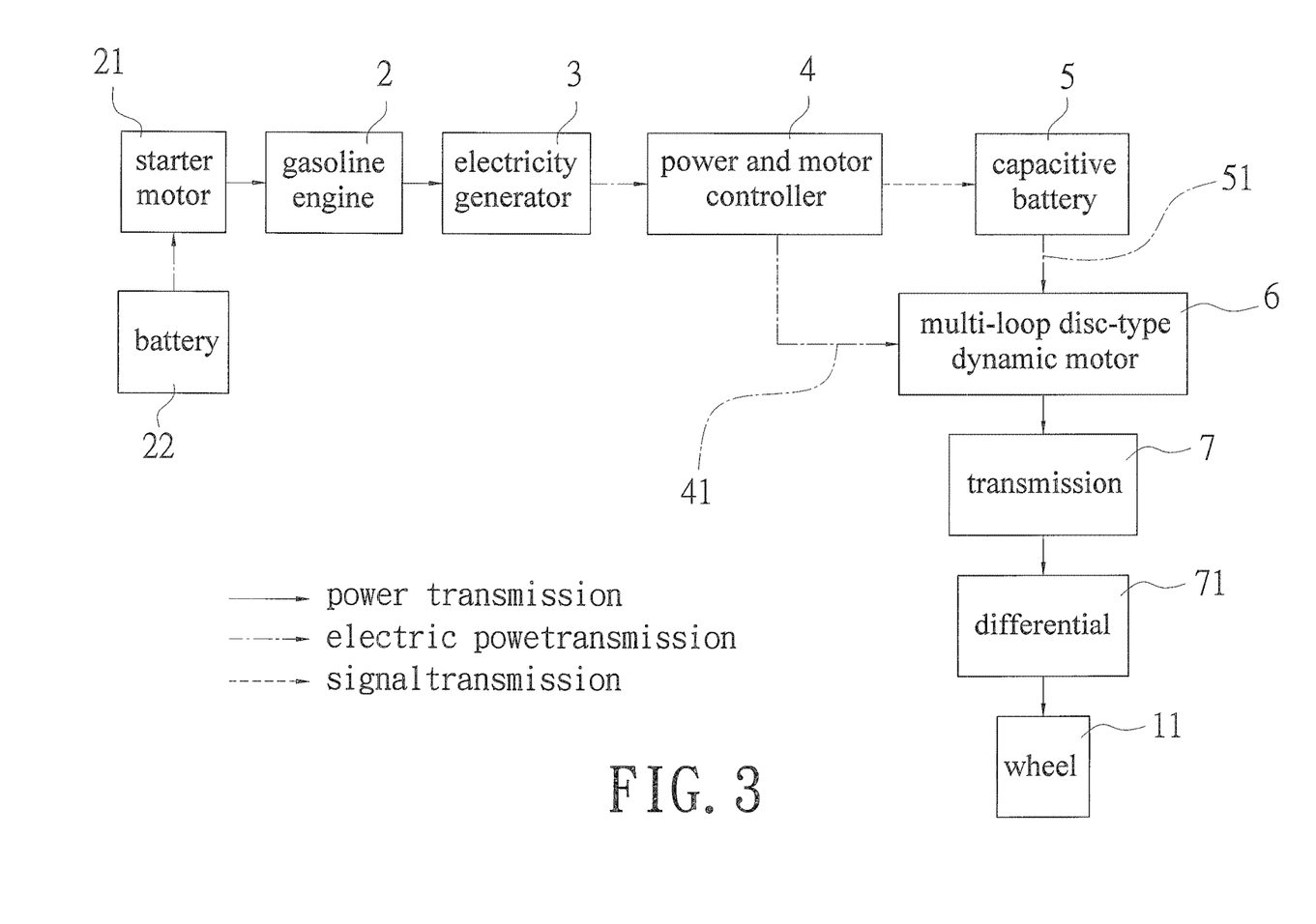
FIG. 3 is a control process flow diagram of an energy efficient vehicle according to one embodiment of this invention.

First, please refer to FIGS. 1-3, which show an energy efficient vehicle according one embodiment of this invention. The energy efficient vehicle comprises a car body 1, wheels 11 installed on two sides of the front side and rear side of the car body 1, a starter motor 21, and a battery 22 connected to the starter motor 21. The battery 22 can provide 12 V DC electrical current.

The car body 1 further has a small ultra-high speed gasoline engine 2 connected with the starter motor 21 and a high-efficiency electricity generator 3 connected with the gasoline engine 2. The volume of the gasoline engine 2 is about ¼ of the same-type gasoline engine, and the speed of the gasoline engine 2 is about 4000-14000 rpm. The gasoline engine 2 is mainly used to drive the electricity generator 3 to generate electricity. The electric power generated by the electricity generator 3 is a large current with a high-voltage.

The car body 1 further comprises a power and motor controller 4 and at least a capacitive battery 5. The capacitive battery 5 has a large electrical capacity and can be fast charged and discharged. The power and motor controller 4 is connected with the electricity generator 3 and the capacitive battery 5. The power generated by the electricity generator 3 can be regulated and rectified by the power and motor controller 4, so that the regulated electric power is suitable to be stored into the capacitive battery 5.

A multi-loop disc-type dynamic motor 6 is further assembled under the hood of the car body 1. The capacitive battery 5 and the multi-loop disc-type motor 6 are connected by a power cable 51. Two support beams 12 are disposed on two sides of the bottom of the car body 1. The support beams 12 each comprises a first support section 121, a second support section 122, and an anti-shock buffer shaft 123 pivotally connected between the first support section 121 and the second support section 122. A holder 13 is assembled between the two support beam 12, and the multi-loop disc-type dynamic motor 6 is locked on the holder 13. The power and motor controller 4 and the multi-loop disc-type dynamic motor 6 is connected by a signal cable 41, so that the power and motor controller 4 can control the start, operation speed and stop of the multi-loop disc-type dynamic motor 6.

The rotational shaft 69 of the multi-loop disc-type dynamic motor 6 is connected to a transmission 7 of the car body 1 through a driver assembly 73, which may be a gear mechanism. The transmission 7 may be an automatic transmission or a manual transmission. In this embodiment, an automatic transmission is used. The transmission 7 is connected to a differential 71 assembled on the front or rear side of the car body 1. A shift lever 72 is disposed in the driving room and connected to the transmission 7 to control the gear position of the transmission 7.

An engine exhaust purification device 8 is assembled on the car body 1. One end of the engine exhaust purification device 8 is connected to the gasoline engine 2. Another end of the engine exhaust purification device 8 is connected to one end of an exhaust pipe 81. The other end of the exhaust pipe 81 is connected to an exhaust muffler 82.

At least a heat sink is assembled on the site of the gasoline engine 2, the electricity generator 3, and the multi-loop disc-type dynamic motor 6 of the car body 1 to dissipate the heat generated by the gasoline engine 2, the electricity generator 3, and the multi-loop disc-type dynamic motor 6.

Please refer to FIGS. 4-7. The multi-loop disc-type dynamic motor 6 comprises a stator base 61. A chamber 611 is disposed inside the stator base 61. A groove 612 is disposed on the center of the bottom of the chamber 611. A shaft hole 613 penetrates the bottom of the groove 612. A bearing 62 is disposed in the groove 612. A stopper 621, such as a C-type buckle 621, is disposed on the opening of the groove 612 to position the bearing 62 in the groove 612. The shaft hole 613 of the chamber 611 is to be the center, and several concentric annular ribs 614 with increasing diameters are disposed on the chamber 611 with the shaft hole 613 as the center. Several annular slots 615 are disposed between the annular ribs 614. Several stator rings 63 made from silicon steel are respectively disposed in the several annular slots 615. Several notches 631 are disposed on the outer walls of the stator rings 63. Latches 616 are disposed on the annular ribs 614 and the walls of the chamber 611 to be corresponding to the notches 631, so that the latches 616 can respectively clip the notches 631 of the stator rings 63 for positioning. Several coil holes 632 are located in the walls of the stator rings 63 and along the axial direction of the stator rings 63. Each of the coil holes 632 has an embedded ditch 633 on the inner sidewall of the stator rings 63 to communicate with the coil holes 632. A coil 64 is wound and disposed between two adjacent coil holes 632 and the adjacent coils 64 are connected in series. One terminal of the series coils 64 is connected to the power cable 51 of the capacitive battery 5. At least one coil 64 is connected to a Hall device 65. The Hall device 65 can be inserted into the embedded ditches 633 of the coil holes 632. A coupling flange 617 is formed on the opening of the chamber 611 of the stator base 61. The coupling flange 617 has several lock holes 618.

Figure 4:
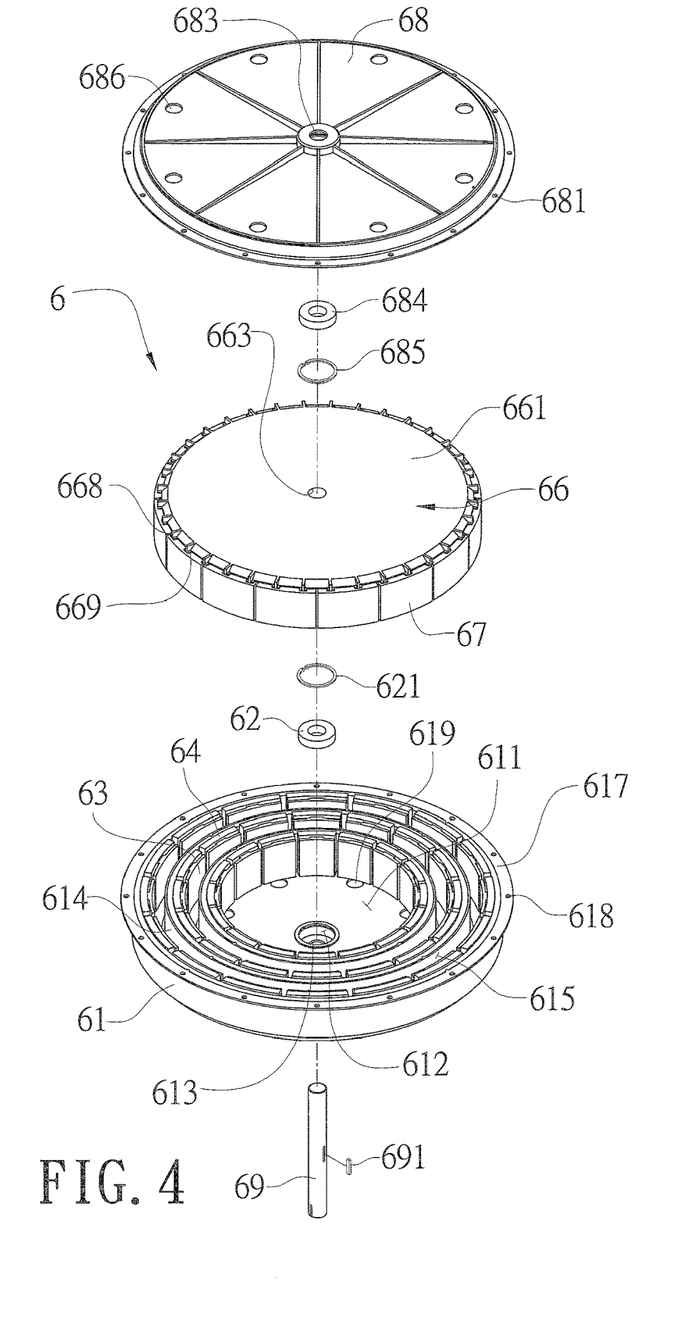
FIG. 4 is an exploded view of a multi-ring disc-type dynamic motor according to one embodiment of this invention.
Figure 6:
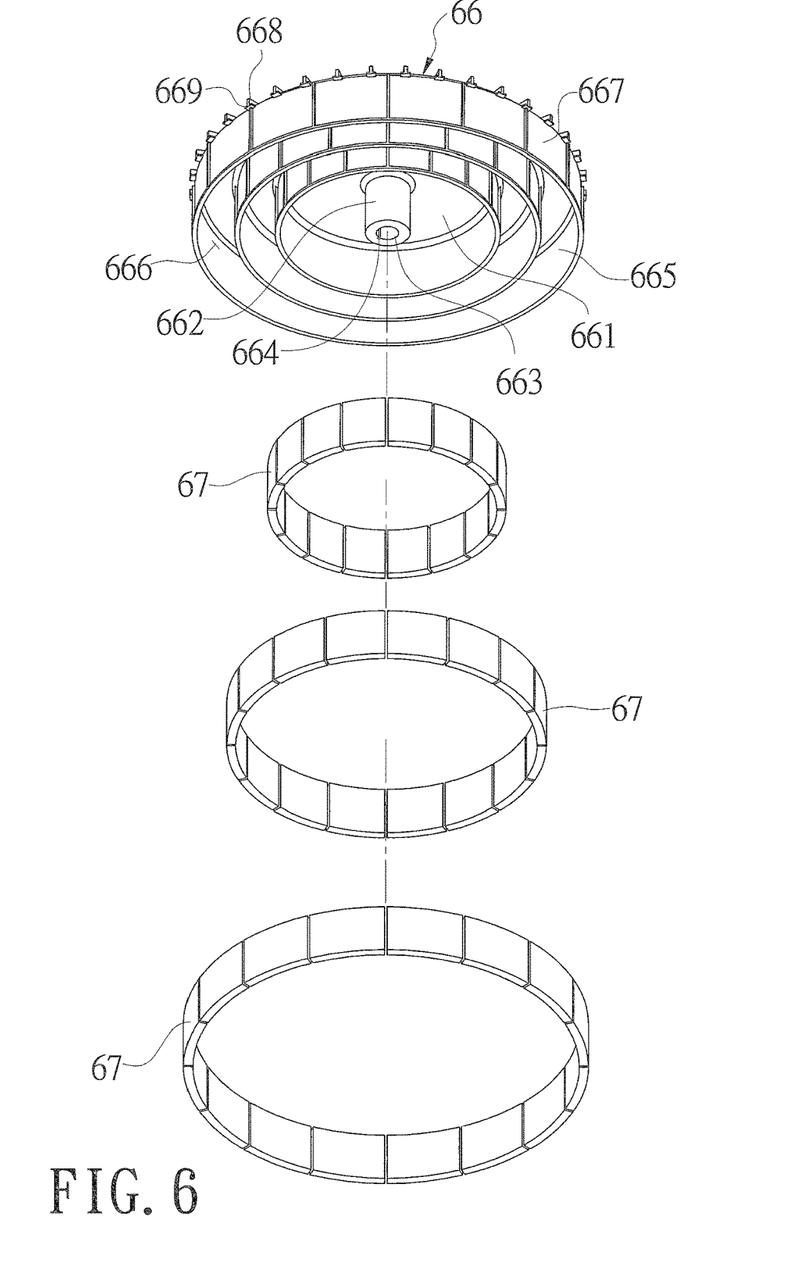
FIG. 6 is an exploded view of rotor base and permanent magnets of the multi-ring disc-type dynamic motor according to one embodiment of this invention.
Figure 7:
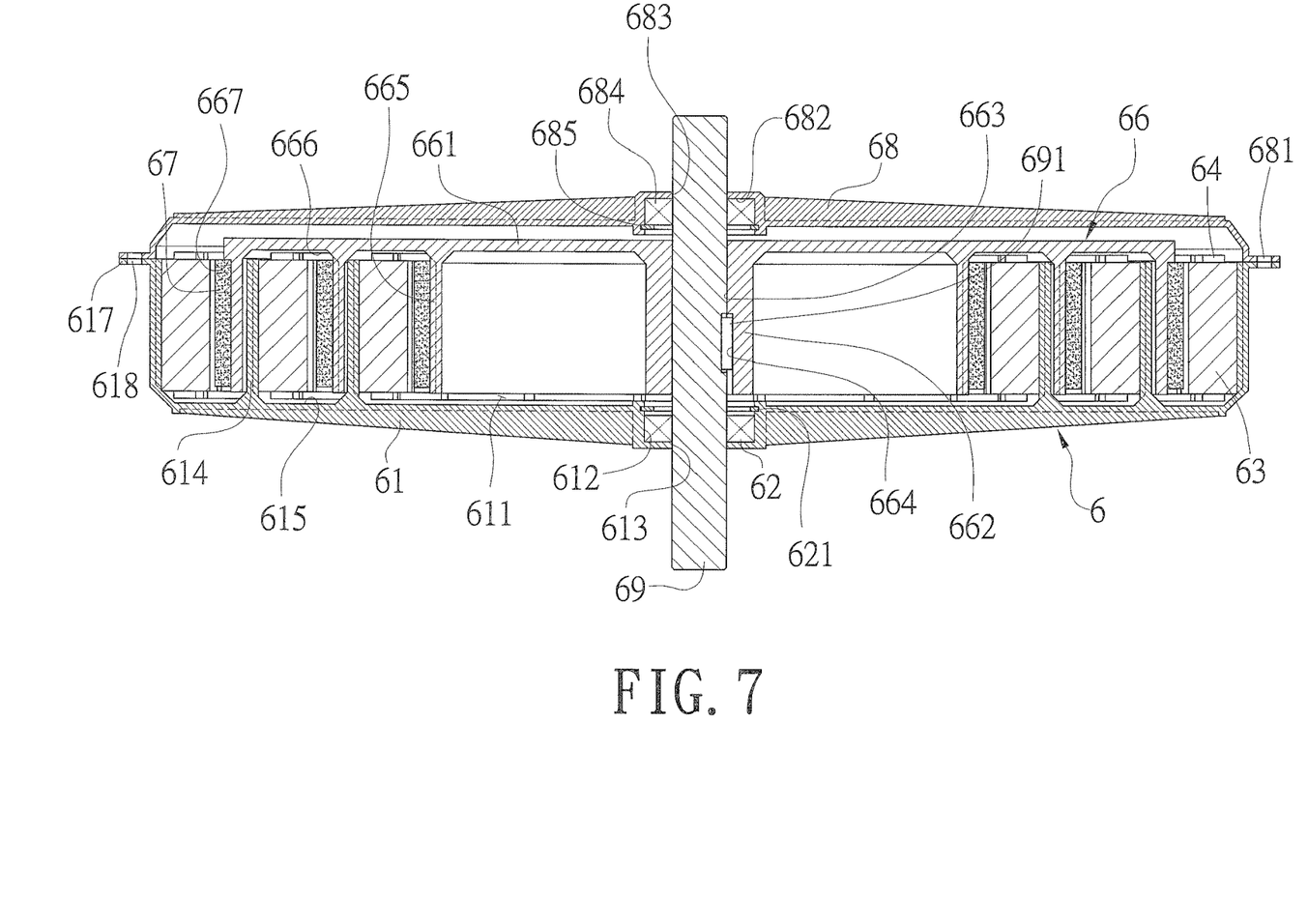
FIG. 7 is a cross-sectional diagram of the multi-ring disc-type dynamic motor according to one embodiment of this invention.

A rotor base 66 is provided. A shaft sleeve 662 is positioned in the center of the foundation 661 of the rotor base 66. A shaft hole 663 penetrates the center of the shaft sleeve 662. A groove-shaped positioning slot 664 is formed on the sidewall of the shaft hole 663. The foundation 661 is centered on the shaft hole 663, and several concentric annular ribs 665 with increasing diameters are disposed on the chamber 611 with the shaft hole 663 as the center. Several annular slots 666 are disposed between the annular ribs 665. Several intercalation parts 667 are concavely disposed on outer walls of the annular ribs 665. Each intercalation part 667 is intercalated by a permanent magnetic sheet 67.

Figure 8:
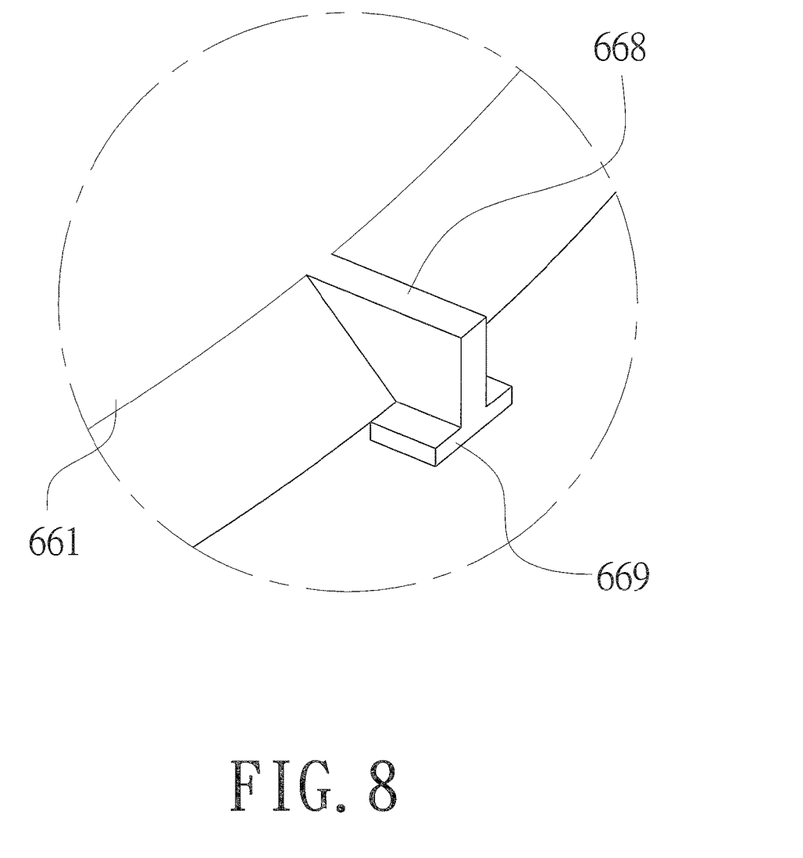
FIG. 8 is a partial magnified view of the rotor base of the multi-ring disc-type dynamic motor according to one embodiment of this invention.

Please also refer to FIG. 8. Several balance sheets 668 are disposed on the periphery of the foundation 661 of the rotor base 66. Several reinforcing sheets 669 are respectively disposed on the bottom of the balance sheets 668, and each of the reinforcing sheets 669 is respectively connected to one of the balance sheets 668. The reinforcing sheets 669 and the balance sheets 668 are connected as one.

The rotor base 66 is engaged with the stator base 61. The annular ribs 614 of the stator base 61 and the stator rings 63 are respectively disposed in the annular slots 666 of the rotor base 66. The annular ribs 665 of the rotor base 66 and the permanent magnetic sheets 67 intercalated thereon is disposed in the annular slots 615. Therefore, the permanent magnetic sheets 67 of the annular ribs 665 of the rotor base 66 are respectively corresponding to the coils 64 of the stator rings 63 in the annular slots 615 of the stator base 61.

A liner cover 68 is provided to cover the opening of the chamber 611 of the stator base 61. Several lock holes 681 are disposed on the periphery of the liner cover 68 to correspond to the lock holes 618 of the coupling flange 617 of the stator base 61. Locking parts penetrate the lock holes 618 of the stator base 61 and the lock holes 681 of the liner cover 68 to lock the stator base 61 and the liner cover 68 together. A groove 682 is disposed on the center of the liner cover 68. A shaft hole 683 penetrate the bottom of the groove 682 to accommodate a bearing 684. A stopper 685, such as C-shaped buckle, is disposed on the opening of the groove 682 to position the bearing 684 in the groove 682. The shaft hole 683 of the liner cover 68 is also corresponding to the shaft hole 663 of the rotor base 66 and the shaft hole 613 of the stator base 61. A rotational shaft 69 penetrates the shaft hole 683 of the liner cover 68, the shaft hole 663 of the rotor base 66, and the shaft hole 613 of the stator base 61, and penetrates and connects the bearing 684 of the groove 682 of the liner cover 68 and the bearing 62 of the groove 612 of the stator base 61. A positioning block 691 is disposed on the rotational shaft 69 to be inserted to the positioning slot 664 on the wall of the shaft hole 663 of the rotor base 66. Two ends of the rotational shaft 69 extending out from the shaft hole 683 of the liner cover 68 and the shaft hole 613 of the stator base 61. Several through holes 686 are disposed on the liner cover 68, and several through holes 619 are disposed on the bottom of the chamber 611 of the stator base 61.

Accordingly, when the embodiment above is implemented, the starter motor 21 drives the small ultra-high speed gasoline engine 2. Then, the gasoline engine 2 drives the connected high-efficiency electricity generator 3 to generate electric energy with high voltage and large current. After the power and motor controller 4 regulates and rectifies the generated electric energy by the electricity generator 3 to a proper state, the electric energy is then transferred to and stored in the capacitive battery 5. The capacitive battery 5 transfers the stored electric energy to the coils 64 of the stator rings 63 of the multi-loop disc-type dynamic motor 6 through the power cable 51 to make the coils 64 of the stator rings 63 to be conductive. Hence, a rotating magnetic field is generated between the permanent magnetic sheets 67 to rotate the rotor base 66. At this time, the rotational shaft 69 is rotated with the rotor base 66. The rotational shaft 69 of the multi-loop disc-type dynamic motor 6 drives the connected transmission 7 to carry out the required torque and horsepower conversion. Wheels 11 on two sides are then driven by the differential 71 to drive the energy-saving vehicle of this invention.

The shift lever 72 set in the driving room can control the gear position of the transmission 7 in response to various driving conditions. When the gasoline engine is actuated, the exhaust gas from the gasoline engine 2 will pass through the engine exhaust gas purifier 8 and then the exhaust pipe 81 to discharge the exhaust gas from the exhaust muffler 82 at the rear end of the car body 1, so that low pollution, low noise and other environmental needs can be achieved.

A plurality of stator rings 63 with gradually increasing diameters are disposed on the stator base 61 of the multi-loop disc-type dynamic motor 6, and a plurality of annular ribs 665 are also disposed on the rotor base 66 docked on the stator base 61. Hence, a plurality of stator rings 63 and a plurality of annular ribs 665 are capable of being respectively added to form an extremely long twist radius. Moreover, a plurality of coils 64 are disposed on the stator rings 63 and a plurality of the permanent magnetic sheets 67 are disposed on the annular ribs 665, the twist radius of the multi-loop disc-type dynamic motor 6 and the number of the permanent magnetic sheets 67 both are several times of those of the present cylindrical motor 9. According to the design, under the same electric voltage and current, the multi-loop disc-type dynamic motor 6 can produce torque and horsepower that are several times more than that produced by the existing cylindrical motor 9. Therefore, the horsepower needed when starting and driving as well as the torque needed when climbing can be easily achieved to effectively save the energy. Hence, the car's endurance can be improved, and the car does not need to stop for charging.

In addition, the design of the multi-loop disc-type dynamic motor 6 is quite simple, so that the producing and repairing cost is quite low, and it is not easy to damage the car.

Figure 5:
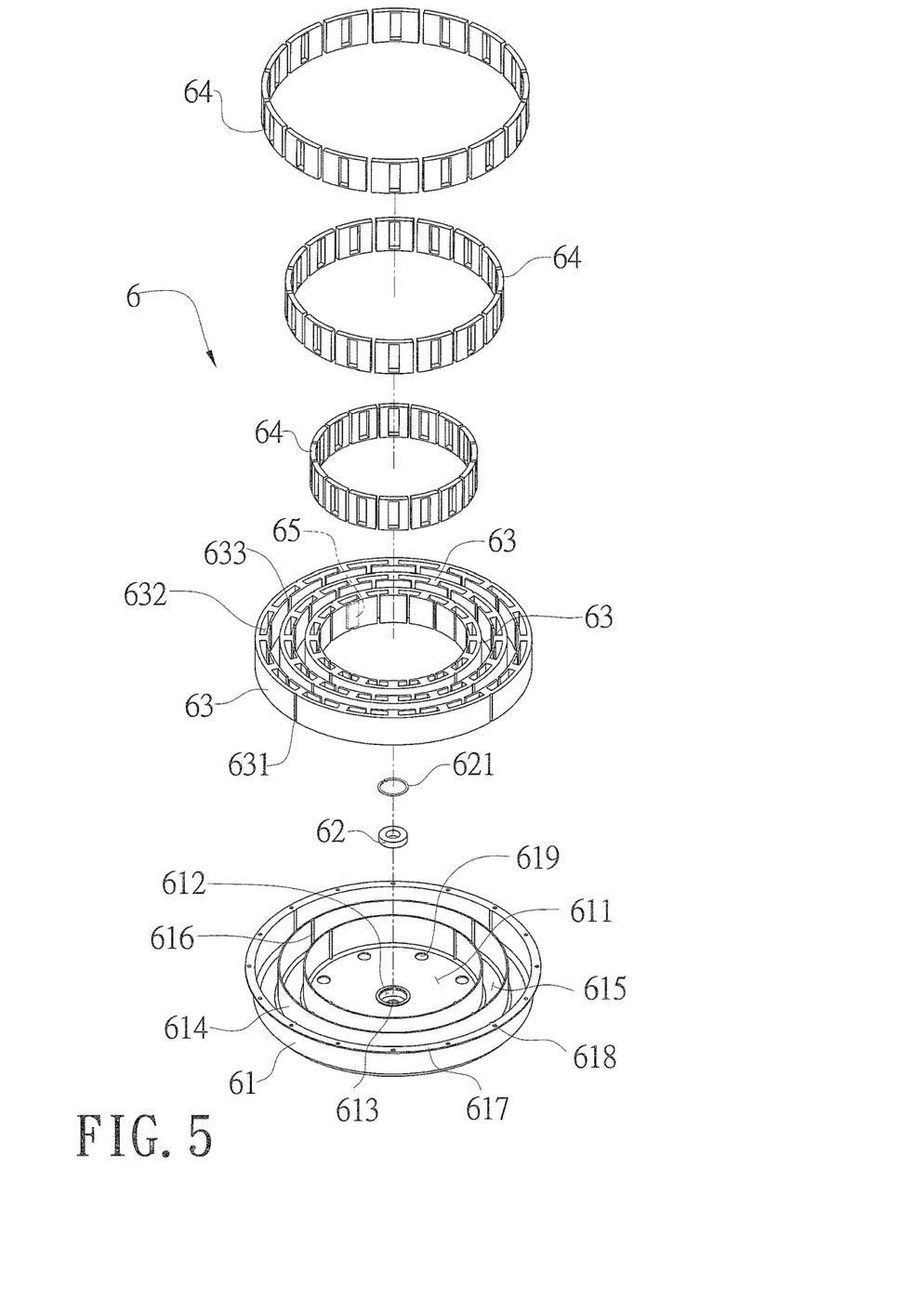
FIG. 5 is an exploded view of stator base, stator ring, and coils of the multi-ring disc-type dynamic motor according to one embodiment of this invention.

Furthermore, the Hall device 65 is disposed in the multi-loop disc-type dynamic motor 6 to sense the strength change of the magnetic field when the rotor base 66 rotates, and the coils 64 on the stator rings 63 will generate the corresponding voltage regulation. Hence, the multi-disc type power motor 6 is running more smoothly and efficiently.

When the rotor base 66 of the multi-loop disc-type dynamic motor 6 rotates, the balance sheets 668 on the periphery of the rotor base 66 can generate wind power to dissipate heat from the through holes 686 of the liner over 68 and the through holes 619 of the stator base 61. Moreover, the design of balance sheets 668 and the reinforcing sheets 669 on the outer periphery of the rotor base 66 is more advantageous to maintain the balance of the rotor base 66 when rotating. Therefore, the rotor base 66 is rotated so as not to interfere with the stator base 61 and thus no abrasion is produced to improve the smooth running of the rotor base 66.

Figure 9:
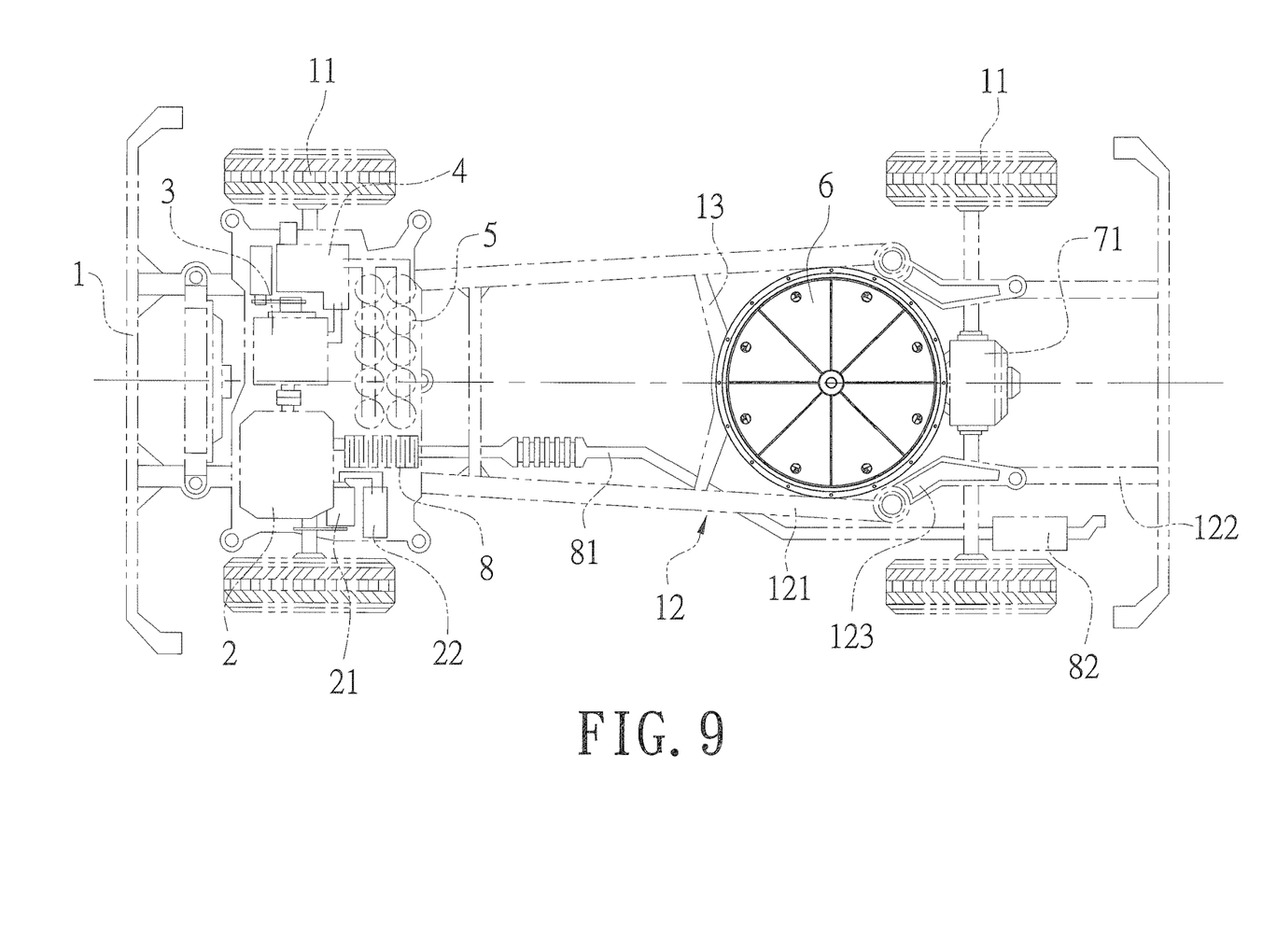
FIG. 9 is a bottom view of an energy efficient vehicle according to another embodiment of this invention.

The forgoing embodiments and figures are not intended to limit the modes of this invention. In this invention, the multi-loop disc-type dynamic motor 6 can be assembled under the hood in front of the car body 1, so that the transmission 7 can be connected to the differential 71 on the two front wheels 11 to be the front wheel drive. Please refer to FIG. 9. The multi-loop disc-type dynamic motor 6 also can be installed under the luggage compartment on the rear side of the car body 1. After being connected to the transmission 7, the transmission 7 can be connected to the differential 71 on the two rear wheels 11 to be the rear wheel drive.

Figure 10:
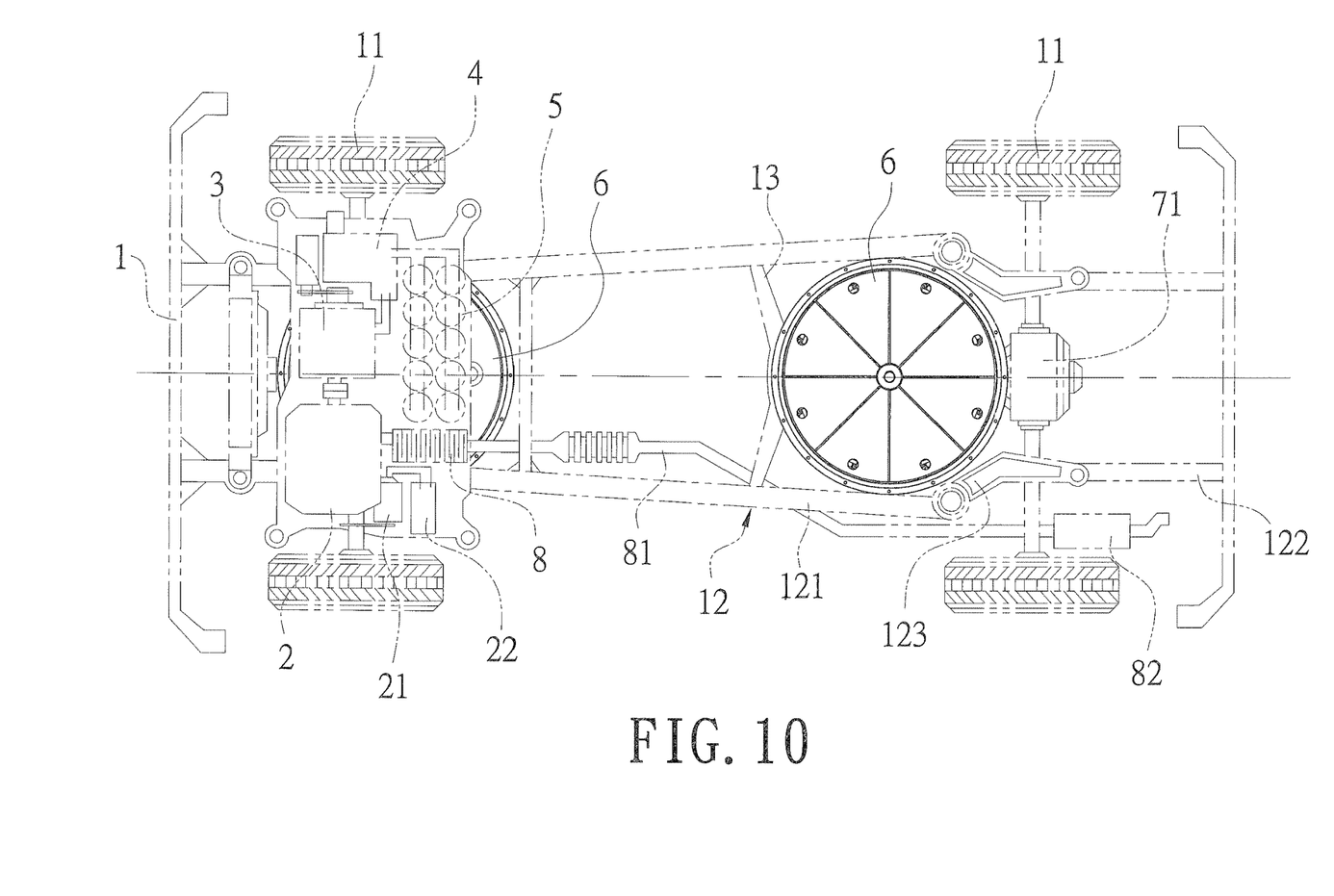
FIG. 10 is a bottom view of an energy efficient vehicle according to yet another embodiment of this invention.

Please also refer to FIG. 10. Two multi-loop disc-type dynamic motors 6 also can be respectively installed under the hood in front of the car body 1 and under the luggage compartment on the rear side of the car body 1. Two holders 13 are respectively installed on front and rear sides between the two support beams 12, and the two multi-loop disc-type dynamic motors 6 are respectively fixed on the two holders 13. The capacitive battery 5 are connected to two power cables 51 connected to the two multi-loop disc-type dynamic motors 6 disposed on the front and rear sides of the car body 1, respectively. The power and motor controller 4 also have two signal lines 41 to respectively connected to the two multi-loop disc-type dynamic motors 6 disposed on the front and rear sides of the car body 1. Two transmissions 7 are respectively connected to the two multi-loop disc-type dynamic motors 6 disposed on the front and rear sides of the car body 1. The two transmissions 7 respectively connected to the two differentials 71 of the two wheels 11 disposed on the front side of the car body 1 and two wheels 11 disposed on the rear side of the car body 1. Accordingly, the multi-loop disc-type dynamic motors 6 can be provided to the four-wheel drive vehicles, such as off-road vehicles and chariots.

Furthermore, the energy efficient vehicle of this invention includes the gasoline engine 2, the electricity generator 3, and the capacitive battery 5, that can also can be replaced by general batteries. A plurality of batteries are assembled to be a power supply unit connected with a power cable to provide electricity to the multi-loop disc-type dynamic motor 6. The design of large twist radius of the multi-loop disc-type dynamic motor 6 and the multiple permanent magnetic sheets 67 can save at least half electricity when the design is used in a pure electric car, comparing with the existing pure electric cars.

In addition, the multi-loop disc-type dynamic motor 6 also can be used as the power source of a ship or a submarine for long maritime navigation, since its high torque and horsepower output and power saving performance. Moreover, the multi-loop disc-type dynamic motor 6 is very quiet. When the multi-loop disc-type dynamic motor 6 is used in a submarine to prevent the submarine from being detected by a sonar.

In light of the forgoing structures and embodiments, this invention has advantages below.

1. In this invention, the multiple stator rings of the stator base of the multi-loop disc-type dynamic motor and the multiple permanent magnetic sheets disposed on the multiple annular ribs of the rotor base can generate high torque and horsepower. The energy can be effectively saved to improve the car's endurance, and thus the car does not need to stop for charging.

2. In this invention, an engine exhaust purification device and an exhaust muffler are installed on the energy efficient vehicle, so that the exhaust gas from the gasoline engine can be filtered by the engine exhaust purification device and then pass through the exhaust muffler to discharge the exhaust gas. Therefore, the environmental protection need of low pollution and low noise can be satisfied.

3. In this invention, the simple design of the multiple stator rings of the stator base of the multi-loop disc-type dynamic motor and the multiple permanent magnetic sheets disposed on the multiple annular ribs of the rotor base can achieve the effect of energy saving as well as high torque and high horsepower transmission. Since the structure is simple, the production and maintaining cost can be effectively decreased, and car is not easy to be damaged.

4. In this invention, a Hall device is disposed on the stator base of the multi-loop disc-type dynamic motor and connected to the coils, so that the Hall device can sense the strength of the magnetic field to generate the corresponding voltage regulation. Therefore, the running smoothness and efficiency of the multi-loop disc-type dynamic motor can be improved.

5. In this invention, several balance sheets disposed on the outer periphery of the rotor base of the multi-loop disc-type dynamic motor to produce wind power to dissipate heat when the rotor base rotates. The design of the balance sheets and reinforcing sheets disposed on outer periphery of the rotor base to maintain the balance of the rotor base when rotating. Therefore, the rotor base is rotated so as not to interfere with the stator base and thus no abrasion is produced to improve the smooth running of the rotor base.

Accordingly, the embodiments of this invention indeed can achieve the expected effect. The disclosed embodiments not only appearing in the similar products, nor has it been made public before the application. Thus, this application has been fully in line with the provisions of the patent law and requirements. According to the law, this application is applied for an invention patent, pleaded for the review, and granted the patent.

What is claimed is:

1. An energy efficient vehicle, comprising:
   a car body;
   four wheels respectively disposed on front and rear sides of the car body;
   a gasoline engine disposed in the car body;
   an electricity generator connected to the gasoline engine;
   a power and motor controller connected to the electricity generator;
   a capacitive battery connected to the power and motor controller;
   a multi-loop disc-type dynamic motor disposed on a front or rear side of the car body, wherein the multi-loop disc-type dynamic motor is connected to the capacitive battery by a power cable and is connected to the power and motor controller by a signal cable, and the multi-loop disc-type dynamic motor comprises:
   a stator base having a chamber therein;
   a shaft hole disposed in a center of a bottom of the chamber;
   a plurality of concentric annular ribs with increasing diameters disposed on the bottom of the chamber with the shaft hole as a center;
   a plurality of annular slots disposed between the annular ribs on the stator base;
   a plurality of stator rings respectively disposed in each of the annular slots on the stator base;
   a plurality of coils respectively disposed on the stator rings and connected to the power cable of the capacitive battery;
   a rotor base;
   a shaft sleeve disposed in a center of the rotor base;
   a shaft hole disposed in the shaft sleeve in a penetration mode;
   a positioning part disposed on the wall of the shaft hole of the rotor base;
   a plurality of concentric annual ribs with increasing diameters disposed on the rotor base with the shaft hole as a center;
   a plurality of annular slots respectively disposed between the annular ribs on the rotor base;
   a plurality of permanent magnetic sheets disposed on outer walls of the annular slots on the rotor base, wherein the rotor base is correspondingly engaged with the stator base, so that the annular ribs of the stator base respectively disposed in the annular slots of the rotor base, the annular ribs and the permanent magnetic sheets attached thereon of the rotor base are correspondingly disposed on each of the annular slots, and hence the permanent magnetic sheets are corresponding to the coils of the stator rings in the annular slots of the stator base;

a liner cover covering an opening of the chamber of the stator base, wherein the liner cover is locked on the stator base;

a shaft hole is disposed on a center of the liner cover;

a rotational shaft penetrating the shaft holes of the liner cover, the rotor base, and the stator base, wherein a positioning part of the rotating shaft is combined with the positioning part on the wall of the shaft hole of the rotor base, wherein one end of the rotational shaft is connected to a transmission in the car body, the transmission is connected to a differential on the front or rear side of the car body, and the differential is connected to the corresponding two wheels on the front or rear side of the car body.

2. The energy efficient vehicle of claim 1, further comprising:
a starter motor, wherein the starter motor is connected to the gasoline engine; and
a battery connected to the starter motor disposed in the car body.

3. The energy efficient vehicle of claim 1, further comprising an engine exhaust purification device disposed in the car body, wherein one end of the engine exhaust purification device is connected to the gasoline engine, another end of the engine exhaust purification device is connected to one end of an exhaust pipe, and another end of the exhaust pipe is connected with an exhaust muffler.

4. The energy efficient vehicle of claim 1, further comprising
two support beams disposed on the bottom of the car body, wherein each of the support beams comprises a first support section, a second support section and an anti-shock buffer shaft therebetween to be pivotally connected to the first and the second support sections; and
a holder disposed between the two support beams for fixing the multi-loop disc-type dynamic motor.

5. The energy efficient vehicle of claim 1, further comprising
a driving room in the car body;
a shift lever disposed in the driving room and connected to the transmission.

6. The energy efficient vehicle of claim 1, further comprising a Hall device disposed on the stator rings and connected to the coils on the stator rings in the multi-loop disc-type dynamic motor.

7. The energy efficient vehicle of claim 1, further comparing:
a plurality of balance sheets disposed on a periphery of the rotor base of multi-loop disc-type dynamic motor; and
a plurality of reinforcing sheets disposed on a bottom of the balance sheets, wherein the reinforcing sheets and the balance sheets are connected as one.

8. An energy efficient vehicle, comprising:
a car body;
four wheels respectively disposed on front and rear sides of the car body;
a gasoline engine disposed in the car body;
an electricity generator connected to the gasoline engine;
a power and motor controller connected to the electricity generator;
a capacitive battery connected to the power and motor controller;
two multi-loop disc-type dynamic motors respectively disposed on front and rear sides of the car body, wherein each of the multi-loop disc-type dynamic motors is connected to the capacitive battery by a power cable and is connected to the power and motor controller by a signal cable, and each of the multi-loop disc-type dynamic motors comprises:
a stator base having a chamber therein;
a shaft hole disposed in a center of a bottom of the chamber;
a plurality of concentric annular ribs with increasing diameters disposed on the bottom of the chamber with the shaft hole as a center;
a plurality of annular slots disposed between the annular ribs on the stator base;
a plurality of stator rings respectively disposed in each of the annular slots on the stator base;
a plurality of coils respectively disposed on the stator rings and connected to the power cable of the capacitive battery;
a rotor base;
a shaft sleeve disposed in a center of the rotor base;
a shaft hole disposed in the shaft sleeve in a penetration mode;
a positioning part disposed on the wall of the shaft hole of the rotor base;
a plurality of concentric annual ribs with increasing diameters disposed on the rotor base with the shaft hole as a center;
a plurality of annular slots respectively disposed between the annular ribs on the rotor base;
a plurality of permanent magnetic sheets disposed on outer walls of the annular slots on the rotor base,
wherein the rotor base is correspondingly engaged with the stator base, so that the annular ribs of the stator base respectively disposed in the annular slots of the rotor base, the annular ribs and the permanent magnetic sheets attached thereon of the rotor base are correspondingly disposed on each of the annular slots, and hence the permanent magnetic sheets are corresponding to the coils of the stator rings in the annular slots of the stator base;
a liner cover covering an opening of the chamber of the stator base, wherein the liner cover is locked on the stator base;
a shaft hole is disposed on a center of the liner cover;
a rotational shaft penetrating the shaft holes of the liner cover, the rotor base, and the stator base, wherein a positioning part of the rotating shaft is combined with the positioning part on the wall of the shaft hole of the rotor base,
wherein one end of the rotational shaft is connected to a transmission in the car body, the transmission is connected to a differential on the front or rear side of the car body, and the differential is connected to the corresponding two wheels on the front or rear side of the car body.

9. The energy efficient vehicle of claim 8, further comprising:
a starter motor, wherein the starter motor is connected to the gasoline engine; and a battery connected to the starter motor disposed in the car body.

10. The energy efficient vehicle of claim 8, further comprising an engine exhaust purification device disposed in the car body, wherein one end of the engine exhaust purification device is connected to the gasoline engine, another end of the engine exhaust purification device is connected to one end of an exhaust pipe, and another end of the exhaust pipe is connected with an exhaust muffler.

11. The energy efficient vehicle of claim 8, further comprising
   two support beams disposed on the bottom of the car body, wherein each of the support beams comprises a first support section, a second support section and an anti-shock buffer shaft therebetween to be pivotally connected to the first and the second support sections; and
   a pair of holders disposed between the two support beams for respectively fixing the two multi-loop disc-type dynamic motors.

12. The energy efficient vehicle of claim 8, further comprising
   a driving room in the car body;
   a shift lever disposed in the driving room and connected to the transmission.

13. The energy efficient vehicle of claim 8, further comprising a Hall device disposed on the stator rings and connected to the coils on the stator rings in each multi-loop disc-type dynamic motor.

14. The energy efficient vehicle of claim 8, further comparing:
   a plurality of balance sheets disposed on a periphery of the rotor base of each multi-loop disc-type dynamic motor; and
   a plurality of reinforcing sheets disposed on a bottom of the balance sheets, wherein the reinforcing sheets and the balance sheets are connected as one.

15. An energy efficient vehicle, comprising:
   a car body;
   four wheels respectively disposed on front and rear sides of the car body;
   a power supply unit disposed in the car body;
   a power and motor controller connected to the power supply unit; and
   a multi-loop disc-type dynamic motor disposed on front or rear side of the car body, wherein the multi-loop disc-type dynamic motor is connected to the power supply unit by a power cable and is connected to the power and motor controller by a signal cable, and the multi-loop disc-type dynamic motor comprises:
   a stator base having a chamber therein;
   a shaft hole disposed in a center of a bottom of the chamber;
   a plurality of concentric annular ribs with increasing diameters disposed on the bottom of the chamber with the shaft hole as a center;
   a plurality of annular slots disposed between the annular ribs on the stator base;
   a plurality of stator rings respectively disposed in each of the annular slots on the stator base;
   a plurality of coils respectively disposed on the stator rings and connected to the power cable of the power supply unit;
   a rotor base;
   a shaft sleeve disposed in a center of the rotor base;
   a shaft hole disposed in the shaft sleeve in a penetration mode;
   a positioning part disposed on the wall of the shaft hole of the rotor base;
   a plurality of concentric annual ribs with increasing diameters disposed on the rotor base with the shaft hole as a center;
   a plurality of annular slots respectively disposed between the annular ribs on the rotor base;
   a plurality of permanent magnetic sheets disposed on outer walls of the annular slots on the rotor base,
   wherein the rotor base is correspondingly engaged with the stator base, so that the annular ribs of the stator base respectively disposed in the annular slots of the rotor base, the annular ribs and the permanent magnetic sheets attached thereon of the rotor base are correspondingly disposed on each of the annular slots, and hence the permanent magnetic sheets are corresponding to the coils of the stator rings in the annular slots of the stator base;
   a liner cover covering an opening of the chamber of the stator base, wherein the liner cover is locked on the stator base;
   a shaft hole is disposed on a center of the liner cover; and
   a rotational shaft penetrating the shaft holes of the liner cover, the rotor base, and the stator base, wherein a positioning part of the rotating shaft is combined with the positioning part on the wall of the shaft hole of the rotor base,
   wherein one end of the rotational shaft is connected to a transmission in the car body, the transmission is connected to a differential on the front or rear side of the car body, and the differential is connected to the corresponding two wheels on the front or rear side of the car body.

16. The energy efficient vehicle of claim 15, wherein the power supply unit comprises a plurality of batteries.

17. The energy efficient vehicle of claim 15, further comprising
   two support beams disposed on the bottom of the car body, wherein each of the support beams comprises a first support section, a second support section and an anti-shock buffer shaft therebetween to be pivotally connected to the first and the second support sections; and
   a holder disposed between the two support beams for fixing the multi-loop disc-type dynamic motor.

18. The energy efficient vehicle of claim 15, further comprising
   a driving room in the car body;
   a shift lever disposed in the driving room and connected to the transmission.

19. The energy efficient vehicle of claim 15, further comprising a Hall device disposed on the stator rings and connected to the coils on the stator rings in the multi-loop disc-type dynamic motor.

20. The energy efficient vehicle of claim 15, further comparing:
   a plurality of balance sheets disposed on a periphery of the rotor base of multi-loop disc-type dynamic motor; and
   a plurality of reinforcing sheets disposed on a bottom of the balance sheets, wherein the reinforcing sheets and the balance sheets are connected as one.

* * * * *